United States Patent
Kim

(10) Patent No.: US 6,958,585 B2
(45) Date of Patent: Oct. 25, 2005

(54) WINDSHIELD WIPER SYSTEM ACTIVATED BY SENSING RAINWATER

(75) Inventor: Ill-Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 10/750,242

(22) Filed: Dec. 30, 2002

(65) Prior Publication Data

US 2005/0007054 A1 Jan. 13, 2005

(30) Foreign Application Priority Data

Jul. 10, 2003 (KR) .............................. 10-2003-0046691

(51) Int. Cl.$^7$ .............................. B60S 1/02; H02P 5/00; H02P 1/04
(52) U.S. Cl. .......................... 318/2; 318/443; 318/444; 318/483; 318/DIG. 2; 15/250.001; 15/250.12
(58) Field of Search .......................... 318/443, DIG. 2, 318/444, 483, 456, 445; 15/250.001, 250.12, 250.16, 250.17

(56) References Cited

U.S. PATENT DOCUMENTS

| | | | | |
|---|---|---|---|---|
| 4,355,271 A | * | 10/1982 | Noack .......................... | 318/480 |
| 4,852,205 A | * | 8/1989 | Tanaka et al. ............ | 15/250.17 |
| 5,216,341 A | * | 6/1993 | Nomura et al. .............. | 318/444 |
| 5,239,244 A | * | 8/1993 | Teder ........................... | 318/444 |
| 5,839,800 A | * | 11/1998 | Koga et al. ................... | 303/152 |
| 6,069,461 A | * | 5/2000 | Jaworski et al. ............. | 318/443 |
| 6,218,741 B1 | * | 4/2001 | Braun et al. ................ | 307/10.1 |
| 6,329,781 B1 | * | 12/2001 | Matsui et al. ................ | 318/717 |
| 6,502,024 B2 | * | 12/2002 | Ishihara et al. ................ | 701/41 |
| 6,555,980 B2 | * | 4/2003 | Yabe ........................... | 318/443 |
| 6,617,813 B2 | * | 9/2003 | Morishita et al. ........... | 318/444 |
| 6,696,808 B2 | * | 2/2004 | Schmid et al. .............. | 318/445 |
| 2002/0014873 A1 | * | 2/2002 | Yoshimura ................... | 318/471 |

FOREIGN PATENT DOCUMENTS

JP          5-24513         2/1993

* cited by examiner

*Primary Examiner*—David Martin
*Assistant Examiner*—Elias Hiruy
(74) *Attorney, Agent, or Firm*—Morgan Lewis & Bockius LLP

(57) ABSTRACT

A windshield wiper system activated by sensing rainwater via a rain sensor placed inside the wiping pattern when a multifunction switch lever is in automatic mode. A rain sensor module activates a relay for low speeds and/or a relay for high speeds depending on the detected amount of rainwater. A first voltage detecting means detects battery voltage, a second voltage detecting means detects voltage of an automatic signal, and a microcomputer adjusts the sensitivity of the rain sensor based on a voltage ratio of the automatic signal voltage and the battery voltage. A reformed wiring structure connects the multifunction switch and the rain sensor module, which contributes to a reduction of the weight and cost of the wiring harness. The sensitivity of the rain sensor is not affected by a voltage change.

3 Claims, 2 Drawing Sheets

WINDSHIELD WIPER SYSTEM ACTIVATED BY SENSING RAINWATER

CROSS-REFERENCE TO RELATED APPLICATIONS

This application claims priority of Korean Application No.10-2003-0046691, filed on Jul. 10, 2003, the disclosure of which is incorporated fully herein by reference.

FIELD OF THE INVENTION

The present invention relates to a windshield wiper system activated by sensing rainwater and, more particularly, to a wiper system adapted to detect rainwater and automatically adjust the speed of the wiper according to the detected amount of rainwater.

BACKGROUND OF THE INVENTION

In general, a vehicle has windshield wipers to sweep the windshield so that a driver can see clearly while driving under rain or snow conditions. Wipers can be driven by vacuum or electricity. In particular, electric windshield wipers used in today's vehicles for sufficiently responding to rainfall or snowfall utilize a motor as a power source, operated by a battery.

A windshield wiper system activated by sensing rainwater has been developed and is frequently used today. The wiper system is designed to place a rain sensor inside a wiping pattern of a windshield glass to detect the amount of rainfall. The moving speed of the wiper is thus automatically adjusted according to the amount of rainfall and helps a driver obtain a clear visual field.

However, there is a drawback in the conventional windshield wiper system activated by sensing rainwater in that a multifunction switch and the rain sensor are distantly placed such that a wiring harness connecting the multifunction switch and rain sensor is increased in weight and manufacturing costs are high.

There is another drawback in that the sensitivity of the rain sensor is adjusted by measuring the resistance value of both ends of an intermittent volume (INT volume) of the multifunction switch, thus the sensitivity of the rain sensor can be affected by a voltage change generated from various factors inside the vehicle.

SUMMARY OF THE INVENTION

Embodiments of the present invention provide a windshield wiper system activated by sensing rainwater with a reformed wiring structure between a multifunction switch and a rain sensor module for reducing the weight of a wiring harness and lowering manufacturing cost. The present invention is further disclosed to adjust the sensitivity of the rain sensor only by a resistance value of the intermittent volume (INT volume) of the multifunction switch such that sensitivity of the rain sensor is not affected by a voltage change which may occur from various factors inside the vehicle.

In one embodiment of the present invention, a windshield wiper system activated by sensing rainwater comprises a wiper motor. A relay for low speeds and a relay for high speeds activate the wiper motor at low and high speeds. A multifunction switch outputs an operational signal for a wiper in response to a driver's manipulation. A rain sensor module detects rainwater and activates the relay for low speeds and/or the relay for high speeds according to the detected amount of rainwater when an automatic signal is inputted from the multifunction switch. The rain sensor module further comprises a first voltage detecting means and a second voltage detecting means. The first voltage detecting means detects a battery voltage. The second voltage detecting means detects a voltage of the automatic signal. A microcomputer adjusts the sensitivity of the rain sensor on the basis of a voltage ratio of the automatic signal voltage and the battery voltage.

The first voltage detecting means further comprises voltage dividing resistances connected to a battery power line.

The second voltage detecting means further comprises voltage dividing resistances connected to an intermittent volume resistance of the multifunction switch.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
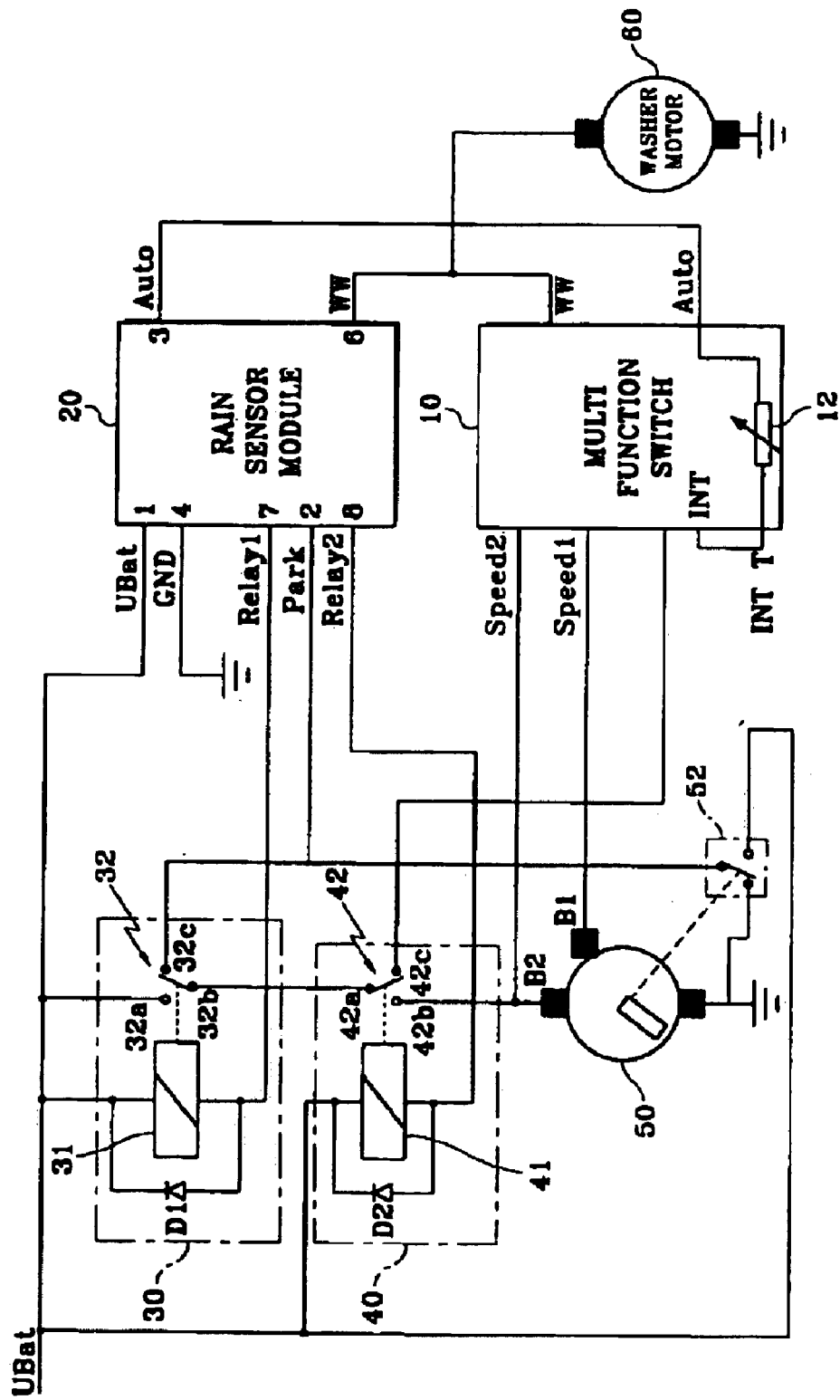
FIG. 1 is a circuit diagram of a windshield wiper system activated by sensing rainwater according to the present invention.

As shown in FIG. 1, a multifunction switch 10 outputs an operational signal for a wiper in response to a driver's manipulation. The multifunction switch 10 includes an intermittent volume resistance 12 therein for outputting an automatic signal (Auto) to a rain sensor module 20.

The rain sensor module 20 detects the amount of rainwater when the automatic signal (Auto) is inputted from the multifunction switch 10. The rain sensor module 20 then activates either a relay for low speeds 30 and/or a relay for high speeds 40 depending on the detected amount of rainwater, thereby activating a wiper motor 50 at low or high speeds. The wiper motor 50 includes a cam plate switch 52 for placing the wiper blade at a fixed position.

A washer motor 60 operates according to a wiper washer signal (WW) outputted from the multifunction switch 10, allowing liquid windshield-washer fluid to squirt onto the windshield.

Figure 2:
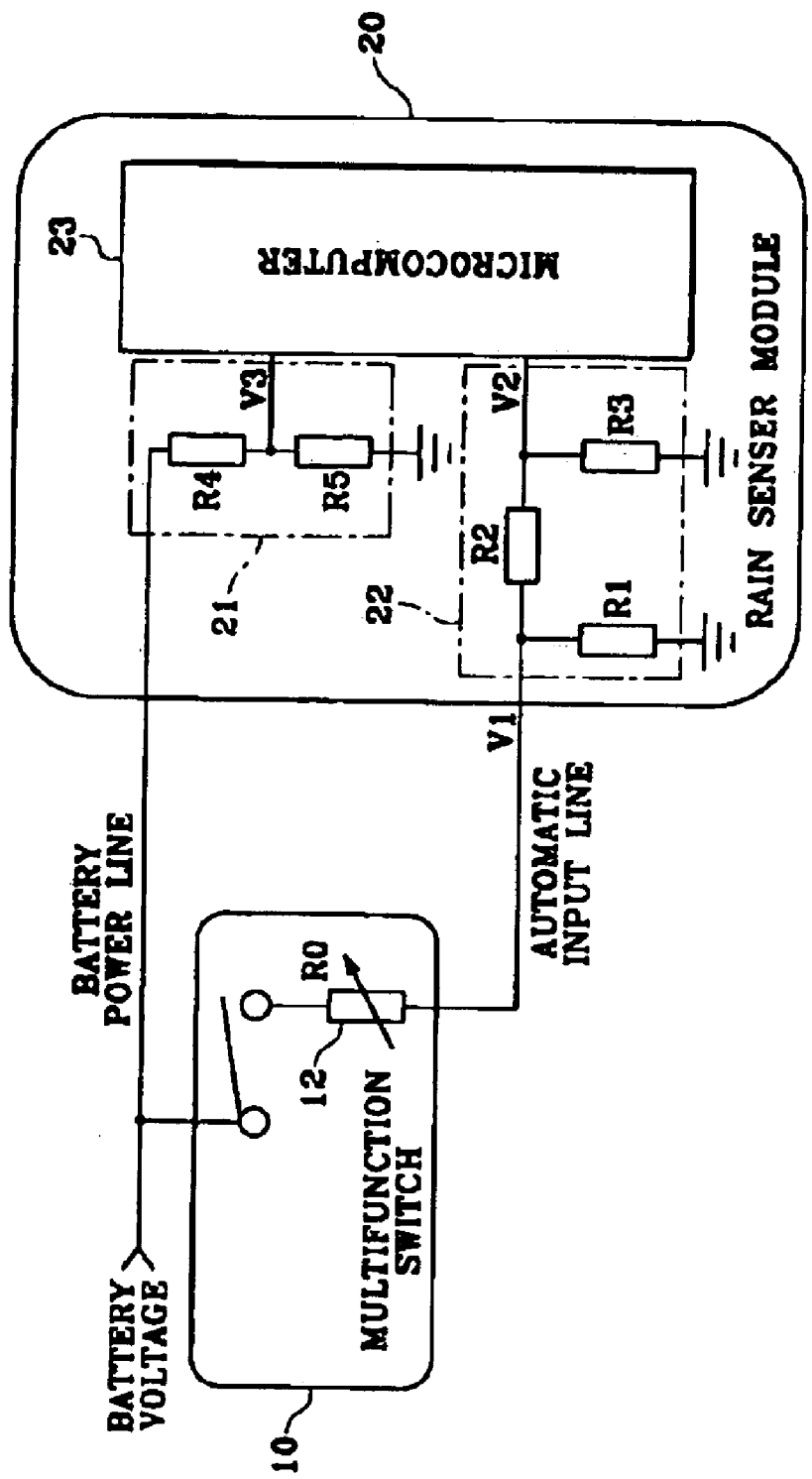
FIG. 2 is a principle circuit diagram of a rain sensor module illustrated in FIG. 1.

The rain sensor module 20, as shown in FIG. 2, comprises a first voltage detecting means 21 for detecting the battery voltage and inputting it to a microcomputer 23. The first voltage detecting means 21 includes voltage dividing resistances R4, R5 connected to a battery power line.

A second voltage detecting means 22 detects a voltage of an automatic signal (Auto) inputted via the intermittent volume resistance 12 of the multifunction switch 10 for inputting it to the microcomputer 23. The second voltage detecting means 22 includes voltage dividing resistances R1, R2, and R3.

The microcomputer 23 adjusts the sensitivity of the rain sensor by a voltage ratio of the automatic signal (Auto) voltage and the battery voltage (UBat) detected via the first voltage detecting means.

The rain sensor module 20 uses a first terminal (UBat) and a third terminal (Auto input) for compensating the voltage change, which might occur from various factors inside the vehicle. The microcomputer 23 of the rain sensor module 20 calculates voltage ratios of the first and third terminals in order to eliminate the effect of voltage change. After the effect of voltage change has been eliminated, the voltage varies only according to the resistance value change of the intermittent volume resistance 12 of the multifunction switch 10.

The microcomputer 23 divides the automatic signal voltage into battery power voltages (power voltage of the rain sensor) for sensing each level of sensitivity of the rain sensor. The battery power voltages offsetting each other do not have any influence upon the sensitivity levels.

The operation and effects of the windshield wiper system activated by sensing rainwater according to the present invention will now be described.

Once a driver manipulates the multifunction switch 10 to be in an automatic mode, the rain sensor module 20 detects the amount of rainwater via the sensing portion of the rain sensor attached inside the windshield glass and starts to automatically adjust the speed of the wiper.

If the rain sensor detects a small amount of rainwater, a signal is outputted to a seventh terminal of the rain sensor module 20 and activates the relay for low speeds 30. A 32a terminal and a 32b terminal of the relay switch for low speeds 32 electrically mutually contact each other so that the power is provided to a brush for low speeds B1 of the wiper motor 50 for activating the wiper at low speeds.

If the rain sensor detects a large amount of rainwater, a signal is outputted to the seventh and eighth terminals of the rain sensor module 20. As the relay for low speeds 30 and the relay for high speeds 40 operate, the 32a terminal and 32b terminal of the relay switch for low speeds 32 electrically contact each other. A 42a terminal and 42b terminal of a relay switch for high speeds 42 also electrically contact each other. The power is provided to a brush for high speeds B2 of the wiper motor 50, and the wiper starts to operate at a high speed.

The amount of rainwater is detected by sensing the resistance value inputted via the third terminal of the rain sensor module 20. The sensitivity of the rain sensor is adjusted by judging the amount of rainwater on the basis of the sensed value.

When the driver engages the windshield-washer fluid to be sprayed onto the windshield, the wiper should be activated simultaneously by embodying a sixth terminal of the rain sensor module 20. A second terminal stops the wiper like a parking function. The first terminal is connected to an ignition power (UBat: battery power), and a fourth terminal is connected to a ground. In short, the rain sensor module according to the present invention is constituted by 7 pins.

As apparent from the foregoing, there is an advantage in that the wiring structure between the multifunction switch and the rain sensor module is reformed, and the weight of the wiring harness and manufacturing cost thereof is reduced.

There is another advantage in that the sensitivity of the rain sensor is adjusted only according to a resistance value of the intermittent volume (INT volume) such that the sensitivity of the rain sensor is not affected by any voltage change, which may occur from various factors inside the vehicle.

What is claimed is:

1. A windshield wiper system activated by sensing rainwater, comprising:
   a wiper motor;
   a relay for low speeds and a relay for high speeds for activating said wiper motor at low and high speeds;
   a multifunction switch for outputting an operational signal for a wiper in response to driver manipulation;
   a rain sensor module for detecting rainwater and activating said relay for low speeds or said relay for high speeds according to the detected amount of rainwater when an automatic signal is inputted from said multifunction switch, wherein said rain sensor module further comprises:
   a first voltage detecting means for detecting a battery voltage;
   a second voltage detecting means for detecting the voltage of said automatic signal; and
   a microcomputer for adjusting the sensitivity of said rain sensor on the basis of a voltage ratio of said automatic signal voltage and said battery voltage.

2. The system as defined in claim 1, wherein said first voltage detecting means further comprises voltage dividing resistances connected to a battery power line.

3. The system as defined in claim 1, wherein said second voltage detecting means further comprises voltage dividing resistances connected to an intermittent volume resistance of said multifunction switch.

* * * * *